May 28, 1935.　　　　K. WIESLER　　　　2,002,621
METHOD FOR THE GENERATION AND MAINTENANCE OF
CONSTANT GAS PRESSURE IN CLOSED SYSTEMS
Filed July 17, 1931　　　4 Sheets-Sheet 1

INVENTOR
KARL WIESLER
BY
*a. w. Weller*
ATTORNEY

May 28, 1935. K. WIESLER 2,002,621
METHOD FOR THE GENERATION AND MAINTENANCE OF
CONSTANT GAS PRESSURE IN CLOSED SYSTEMS
Filed July 17, 1931 4 Sheets-Sheet 2

INVENTOR
KARL WIESLER
BY
ATTORNEY

May 28, 1935.  K. WIESLER  2,002,621
METHOD FOR THE GENERATION AND MAINTENANCE OF
CONSTANT GAS PRESSURE IN CLOSED SYSTEMS
Filed July 17, 1931  4 Sheets-Sheet 4

INVENTOR
KARL WIESLER

Patented May 28, 1935

2,002,621

UNITED STATES PATENT OFFICE 2,002,621

METHOD FOR THE GENERATION AND MAINTENANCE OF CONSTANT GAS PRESSURE IN CLOSED SYSTEMS

Karl Wiesler, Constance Badenia, Germany, assignor to Deutsche Gold- und Silber-Scheideanstalt vormals Roessler, Frankfort-on-the-Main, Germany, a corporation of Germany Application July 17, 1931, Serial No. 551,446
In Germany July 22, 1930

3 Claims. (Cl. 137—78)

The invention relates to a process and apparatus for the generation and maintenance of constant gas pressure for the carrying out of processes in closed systems, as for example, pressure rectifying plant and the like.

It is known that for the carrying out of many technical processes working under pressure, especially under high pressure, is of considerable importance as a result of the advantages connected with it and is already employed in all such processes in which the maintenance of a quite constant pressure plays a secondary part or is without practical importance.

In all such cases, however, in which the maintenance of a constant gas pressure is of decisive importance, it was previously necessary to forego the advantages of pressure raising and was limited merely to working under the approximately constant pressure of the atmosphere. The advantages achieved by pressure raising or pressure reduction were deliberately given up therefore mainly because the previously known means for the maintenance of a constant pressure cannot completely meet the requirements.

In spite of the considerable advantages attainable by pressure raising, as for example the possibility of far-reaching reduction of the volume of the apparatus in consequence of the reduction and the volume of vapour at distillation, for example, especially reduction of the necessary condenser surface and of its cooling water requirement by the raising of the boiling temperature, fine rectifying of liquids is, for example, carried out exclusively at the usual pressure in complicated plants.

In the previously known "pressure distillation" it was not a question of a fine rectification in column apparatus, but merely of the development of vapours from liquids boiling under pressure, whereby the vapours, as for example in the known oil-cracking processes, are condensed outside the pressure apparatus. This primitive arrangement does not suffice for fine rectifying which involves the maintenance of a constant pressure as an indispensable condition, because small pressure oscillations lead to considerable troubles, for example condensation of the vapour and raising of the boiling temperature with rise of pressure.

For this reason one has up to now maintained such fine rectification plants, in order to have a practically approximate constant pressure, in connection with the atmosphere and worked under atmospheric pressure. They had, however, considerable dimensions, especially if it was a question of the working up of low boiling liquids. Moreover, the lack of sufficient quantity of sufficiently cold cooling water besides frequently rendered questionable the carrying out of such processes.

It was now found that the significant advantages of a rise in pressure could be made use of for work which, up to now, on account of the requirement of constant pressure could only be carried out under atmospheric pressure, and in a corresponding manner can maintain constant in a simple manner the necessary pressure height for work carried out under reduced pressure in closed systems, if one brings into connection with the system while avoiding supplying gas, a current of gas generated in an apparatus system outside and independent from the closed system, which gas stream with the aid of any arrangement known in itself and with quantities of gas varying with wide limits is maintained at a constant pressure.

As such a regulator there may be considered, for example, the known pressure regulator for the maintaining constant of the pressure of an air current. These consist of a liquid column which so long as its cross-section is sufficiently large compresses the gas drawn through it to a corresponding pressure, dependent on its height and the specific gravity of the liquid, but independent of the quantity of gas. The constant back pressure generated in this way is transmitted independently of whether, for example, the temperature is constant to the whole closed system connected with the constant gas pressure.

There can be employed instead as a constant resistance for the regulation of the gas pressure other suitable means. For example, there can be employed as a constant resistance for the attainment of a constant gas pressure, a simple throttle device, whereby of course, if its resistance is dependent on the quantity of gas, the quantity of the gas or its velocity must be maintained constant. Finally, there can be employed, for example, also as a constant resistance against a gas current of changing quantity or speed, a safety valve loaded with a constant weight, whereby the gas, in order to lift the weight, is first compelled to assume the appropriate pressure.

Atmospheric air serves especially as regulating gas, which may be allowed to exhaust into the open after passing the regulator; if necessary, however, there can be employed any other desired gas according to the process being carried on in the system, as for example, oxygen, nitrogen, hydrogen, carbon dioxide, acetylene, furnace gases, and others. For the purpose of further or repeated use of such gases, the same may be fed into a collecting container, for example, a gasometer which is connected with the system or the regulator. If the gas flowing to the regulator contains constituents whose removal is necessary before its introduction, or which are to be recovered, then the gas mixture can be subjected to an absorption or other purification either before the regulator, in the same, or even after it. The conveying of the gas can be effected, for example, by pumps, compressors, fans, and the like. Any desired liquid is suitable as regulator liquid but especially water with which a constant pressure even up to several atmospheres can be generated.

With great excess pressures the liquid column is advantageously sub-divided, as in this manner there is attained in the separate regulators a graduation of the accompanying gas volumes and the regulator under high pressure can have a corresponding smaller cross-section. For example, a cylindrical regulator whose cross-section has a diameter of 500 millimetres allows 50 to 60 cubic metres of gas to pass per hour without difficulty.

By changing the resistance of the regulator, for example, by changing of the height of the liquid column in a regulator of the kind described, any desired pressure height is easily adjustable in the connected system even during working.

In order that the invention may be clearly understood and readily carried into effect, it will now be described by way of example with reference to the accompanying drawings, in which:—

Figure 1:
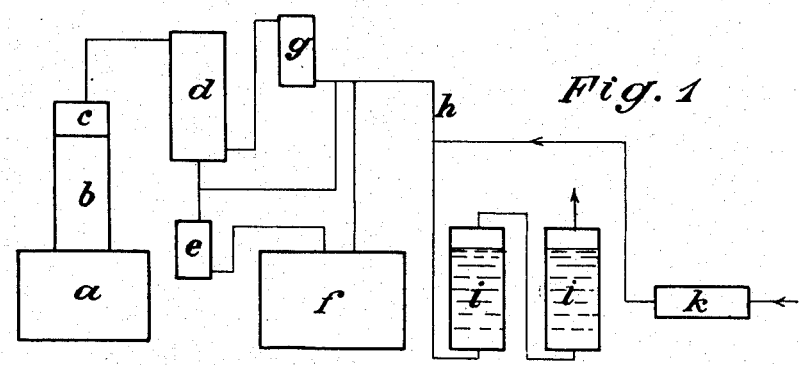
Figure 1 illustrates diagrammatically a continuous acting rectifying apparatus, for example, for the rectification of acetaldehyde which works under constant pressure by means of a connection with a gas conduit whose pressure is maintained constant by a liquid column incorporated as a regulator.

For the continuous rectification of acetaldehyde, which boils at a temperature of 20.8° C. under a barometric pressure of 760 mm. mercury, it is especially advantageous for the lowering of the consumption of cooling water to work at a constant excess pressure of 2 atmospheres. With this object (Figure 1) the apparatus consisting of the distilling column $a$, the rectifying column $b$, the condensing vessel $c$, the aldehyde condenser $d$, the aldehyde cooler $e$, the collecting chamber $f$ and the cooler $g$ is connected by the gas conduit $h$ with the regulator $i$ and the gas conveying means $k$, for example, a rotary compressor. The regulator consists of two liquid vessels connected in series, through which passes, one after the other, the gas supplied from the compressor so that the resistance opposed to the same can be adjusted, by regulation of the liquid level or choice of a filling of corresponding specific gravity, exactly to the desired excess pressure of 2 atmospheres, whereby the boiling point can be raised to approximately 60° C. and the rectifying plant, as a result of the materially lower requirement of cooling water and volume of vapour, can be kept considerably smaller.

Figure 2:
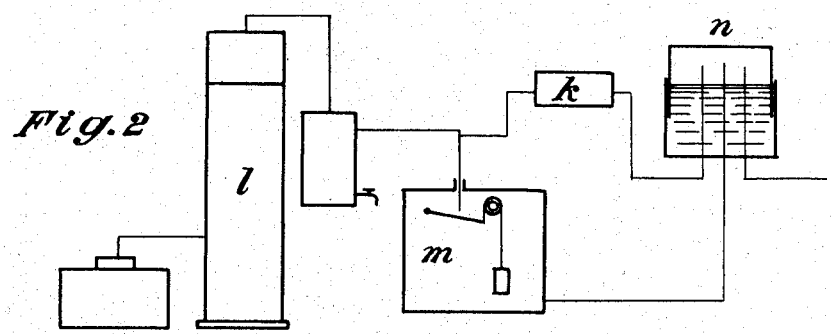
Figure 2 shows diagrammatically a rectification plant in which the quantity of gas supplied for the attainment of a constant pressure is maintained at constant pressure by means of a safety valve loaded with a constant weight.

As Figure 2 shows, the regulation of the gas pressure can also be effected in that the system $l$, for example, a rectifying plant, is connected with an extraneous gas generator $n$ by way of a safety valve $m$ loaded with a constant weight.

Figure 3:
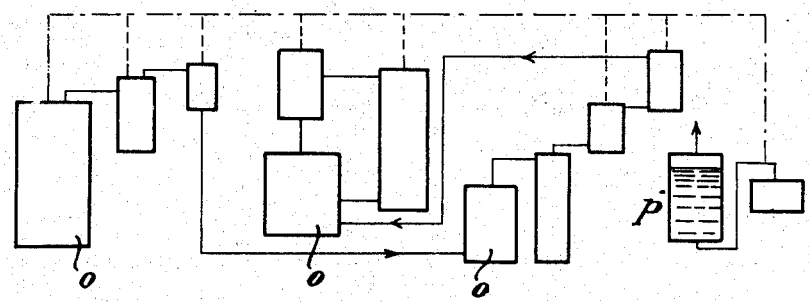
Figure 3 illustrates a plant for continued rectification for the refinement of spirit from crude spirit, which works with an excess pressure of 1 atmosphere in the whole system with the aid of a device according to the method described above.

In the plant $o$ for obtaining pure spirit illustrated in Figure 3, all the de-aerating pipes, as shown in the drawing in dotted lines, are connected to the dot-and-dash collecting pipe which leads into the pressure gas conduit from the compressor $k$ to the regulator $p$, with the object of attaining a constant excess pressure of 1 atmosphere.

Figure 4:
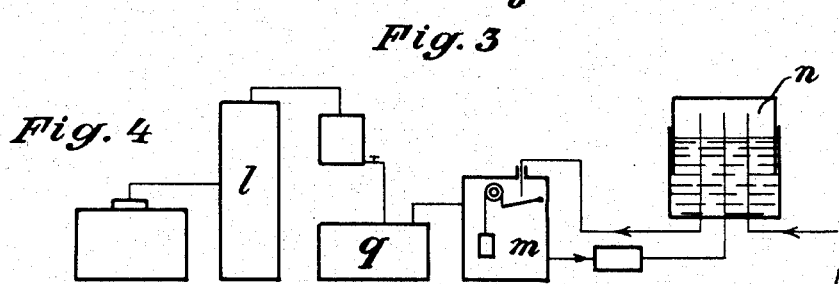
Figure 4 represents a pressure regulating arrangement for a distillation plant working under reduced pressure.

The distillation plant $l$ according to Figure 4 is connected by way of the container $q$ with the regulating arrangement arranged for the maintenance of a constant low pressure in the system, which consists of the safety valve $m$ loaded with a constant weight, the gas withdrawing arrangement $n$ and the compressor. In order to make clear the manner of working of the regulator, the directions of the gas paths are indicated by arrows.

Figure 5:
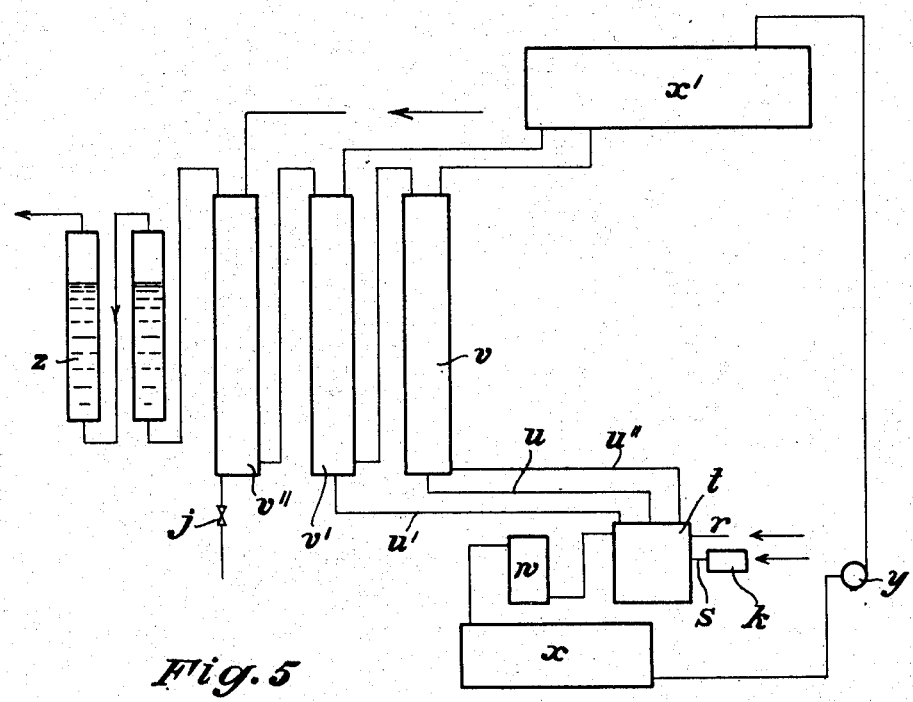
Figure 5 represents a plant for the continued preparation of acetic acid from acetaldehyde.

In the plant for the continuous preparation of acetic acid from acetaldehyde according to Figure 5 there is introduced acetaldehyde through the conduit $r$ and an oxygen containing gas by way of the compressor $k$ and through the conduit $r$ into the boiler $t$ which may be at a temperature of up to 70° C. The resulting vapour mixture is led out of the boiler through the conduit $u''$ to the two inter-connected washing towers $v$ and $v'$, while crude acid from the vessel $t$ flows to a cooler $w$ and from there after cooling to the storage container $x$. By means of the pump $y$ the crude acid collected in this storage container is then pumped to an elevated container $x'$ arranged with the object of overcoming the pressure prevailing in the interior of the whole system, from which the liquid is distributed over the towers $v$ and $v'$ in order to trickle over its filling, e. g. filling bodies, in contra-flow to the oppositely flowing gas. Through the conduits $u$ and $u'$ the liquid finally runs back to the boiler $t$, while the gases flow to the tower $v''$, where they are subjected to washing for the purpose of recovering unchanged constituents. The valve $j$ ensures the running of the resulting washing fluid out of this tower, in order that the liquid, on account of the pressure prevailing in the interior of the system, does not perhaps find an exit with the gases.

The pressure regulating device Z finally is appropriately connected to the washing tower $v''$ so that the pressure is transmitted over the whole system.

The method according to the invention permits finally also the maintaining constant of the quantity of gas to be led to an apparatus in a simple manner by means of one adjustment. With this object there is attached, between the gas conveying means, e. g. a compressor, and the gas path intended for the entry of the gas into the apparatus, a branch which leads a part of the gas to a regulator of the above described kind.

As the gas supplied by the compressor is under a constant pressure owing to the action of the regulator, the cock allows after a single adjustment to a desired quantity of gas, the same quantity of gas to enter the apparatus continuously, as gas pressure and throttle resistance are constant.

By means of a connection of several apparatus to be fed with gas by means of throttle devices to only one gas conveying means, there is avoided the influencing in an undesirable manner of the quantities of gas flowing to the other apparatus, on regulation of the throttle device in one apparatus, by leading a part of the conveyed quantity of gas to a regulator of the kind described.

On the wider opening of a throttle device, more gas is conducted through it, in consequence of which there flows through the regulator a smaller quantity of gas round about the excess. As the same, however, maintains the pressure constant, the quantities of gas flowing through the remaining throttle organs remains unaffected.

For the purpose of giving those skilled in the art a better understanding of the invention and of the principles underlying the systems illustrated in Figs. 1 to 5. The following description will be given of two different types of distillation systems embodying the present invention.

Figure 6:
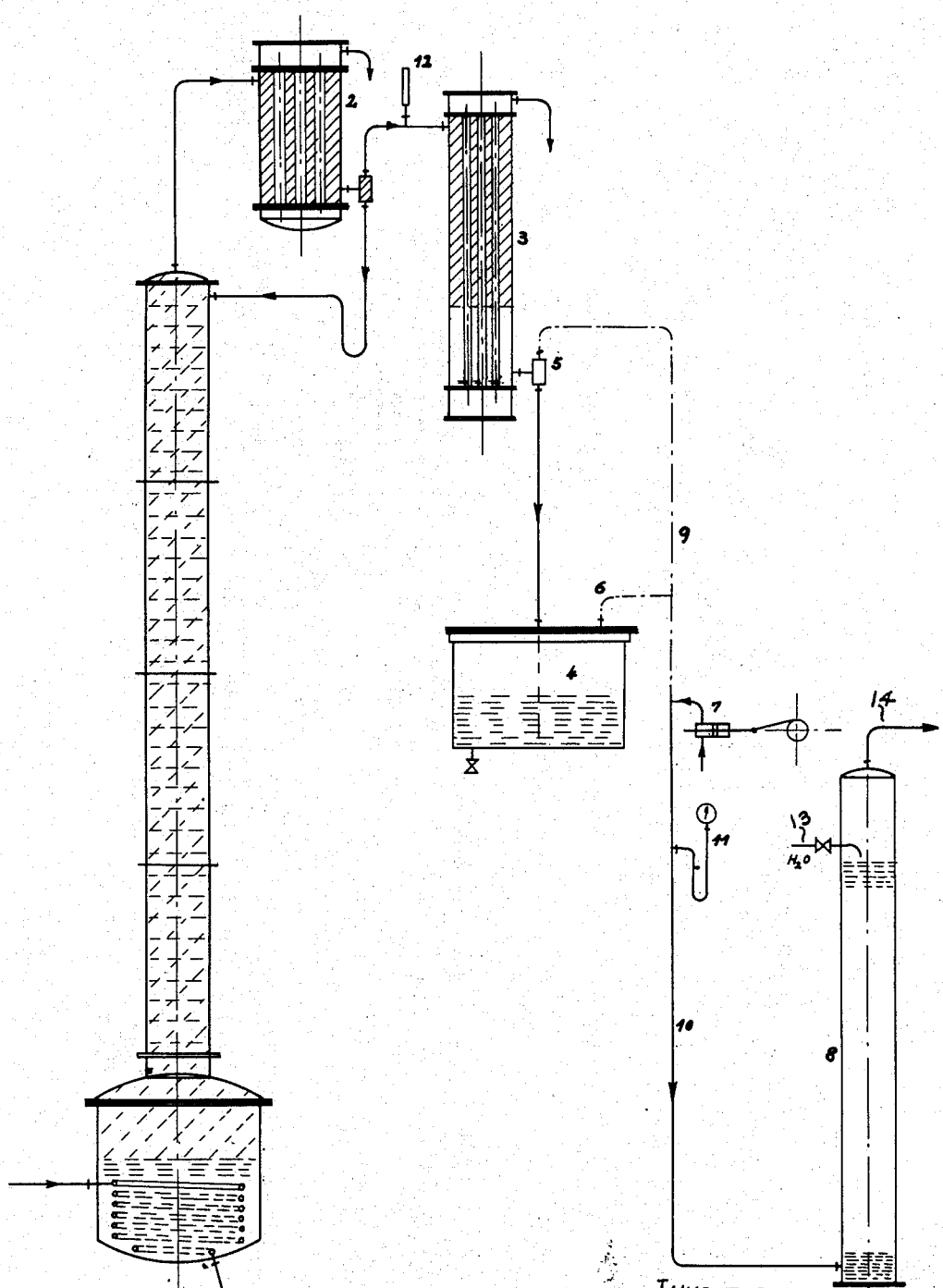
Fig. 6 depicts a distillation system in which the present invention is embodied.

In Fig. 6 a distillation system is shown in which the reference character 1 designates the distillation apparatus. From the top of the distillation apparatus a conduit leads the vapors to a dephlegmator 2 and then to a condenser 3. The liquid from dephlegmator 2 is returned to the top of the distillation apparatus, as is well known, while the liquid from condenser 3 flows to storage container 4. Interposed between condenser 3 and container 4 is a connection 5 which is connected to a compressor 7 by means of conduit 9. A by-pass 6 connects conduit 9 with the top of container 4. Beyond compressor 7 conduit 9 is connected with conduit 10 which is provided with a pressure gauge of manometer 11 and which leads to a water column 8. This column may be supplied with water by means of a valved inlet 13 at the top thereof. An outlet 14 connects the top of water column 8 with the atmosphere.

In the operation of the present process, the distillation apparatus is maintained at such a temperature that thermometer 12 registers about 42° F. By maintaining a constant temperature of about 42° F. at thermometer 12 practically pure acetaldehyde flows to condenser 3 where it is condensed and cooled. From condenser 3 the liquid acetaldehyde flows to container 4. By means of connection 5 the distillation system may be put under any desired pressure which will be indicated by manometer or pressure gauge 11. The pressure is supplied by means of compressor 7 which draws air from the atmosphere and compresses it to a selected pressure, say about 1.2 atmospheres. The selected pressure to be maintained in the distillation system may be controlled very accurately by adjusting the height of the water in water column 8 so as to give the desired pressure. Whenever the compressed air exceeds the selected pressure, compressed air passes through the water column 8 and to the atmosphere via outlet 14.

Figure 7:
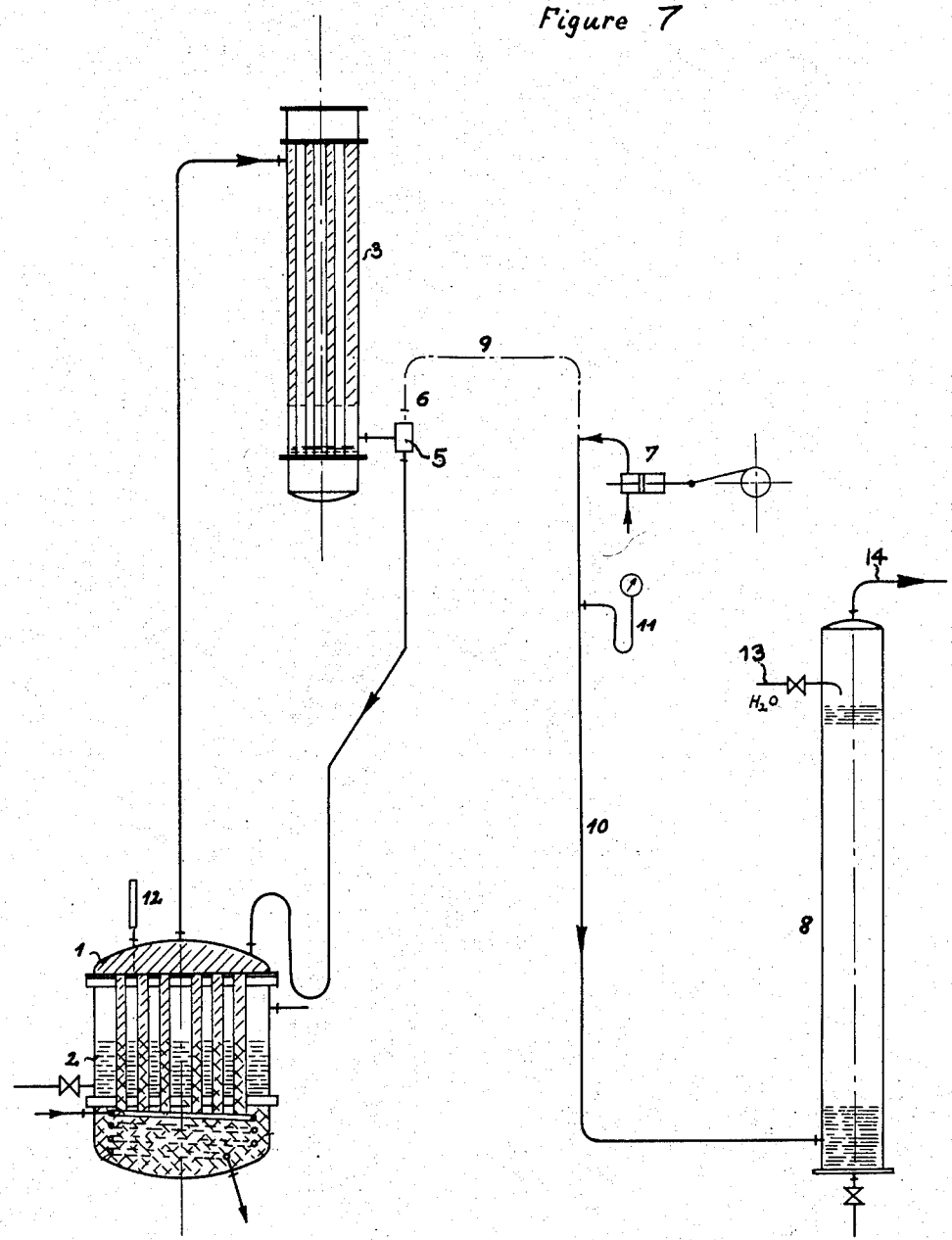
Fig. 7 depicts another form of a distillation system embodying the present invention.

In Fig. 7 another distillation system embodying the present invention is illustrated. In view of the fact that practically all of the elements, parts and members are the same as in Fig. 6, the description will not be repeated but only the difference between the systems will be pointed out.

Thus, in the distillation system shown in Fig. 7 the dephlegmator 2 is incorporated in the distillation apparatus. Instead of using a separate container for receiving the condensed and cooled acetaldehyde a conduit returns the acetaldehyde to a compartment of the distillation apparatus.

The apparatus illustrated in Fig. 7 can be operated in accordance with the principles of the operation of the apparatus shown in Fig. 6. In this case, however, a constant temperature of 133° F. can be maintained and a constant pressure of two atmospheres can be maintained. By utilizing the present method in the depicted distillation system, increased efficiency and economy may be effected.

According to the present invention there is succeeded in maintaining constant the pressure in a system to within 1 mm. of a column of water and in carrying out also those methods, which could previously be carried out only under atmospheric pressure on account of their dependency on the maintenance of a practically constant pressure, at considerably higher or lower pressures whereby great economical advantages are attained.

I claim:—

1. A process for the maintenance of constant gas pressure in a closed distillation system which comprises establishing a closed distillation system generating a pressure and containing a gas and a non-gaseous substance in which system a constant pre-determined pressure is to be maintained, connecting a second independent system to said closed system, continuously passing an uninterrupted gas stream through said second system at a pressure higher than the aforesaid pre-determined constant pressure whereby any deficiency in pressure in the closed system is compensated, and venting said second system at the aforesaid pre-determined pressure thereby releasing excess pressure in said closed system.

2. A process for the maintenance of constant gas pressure in a closed system which comprises establishing a closed system generating a pressure in which system a constant predetermined pressure is to be maintained, connecting a second independent system to said closed system, continuously passing an uninterrupted gas stream through said second system at a pressure higher than the aforesaid pre-determined constant pressure whereby any deficiency in pressure in the closed system is compensated, and venting said second system at the aforesaid pre-determined pressure thereby releasing excess pressure in said closed system while the pre-determined pressure in the closed system is maintained at a lower pressure than atmospheric pressure.

3. A process for the maintenance of constant gas pressure in a closed system which comprises establishing a closed system generating a pressure in which system a constant pre-determined pressure is to be maintained, connecting a second independent system to said closed system, continuously passing an uninterrupted gas stream through said second system at a pressure higher than the aforesaid pre-determined constant pressure whereby any deficiency in pressure in the closed system is compensated, and venting said second system at the aforesaid pre-determined pressure thereby releasing excess pressure in said closed system wherein the venting of the pressure in excess of the pre-determined pressure is effected via a liquid column.

KARL WIESLER.